Feb. 25, 1969 W. E. BAILY ET AL 3,429,025
METHOD OF MAKING NON-METALLIC SWAGED FUEL ELEMENTS
Filed March 17, 1964

WITNESSES
Theodore F. Wrobel
James F. Young

INVENTORS
William E. Baily
and Roberto L. Colombo
BY
Frederick Hope
ATTORNEY 3,429,025
METHOD OF MAKING NON-METALLIC SWAGED
FUEL ELEMENTS
William E. Baily, San Jose, Calif., and Roberto L.
Colombo, Turin, Italy, assignors to Westinghouse
Electric Corporation, Pittsburgh, Pa., a corporation of Pennsylvania
Filed Mar. 17, 1964, Ser. No. 353,028
U.S. Cl. 29—420.5            5 Claims
Int. Cl. B21c 21/06; B22f 3/24; B23p 17/00

ABSTRACT OF THE DISCLOSURE

Fuel elements are prepared by disposing a nuclear fuel material in a sheath, swaging the sheath to achieve a desired density and then heat treating the sheathed material.

---

This invention relates to a method of improving the density of composite nuclear fuel rods and to articles of manufacture comprising the improved fuel rods.

It is known that in heterogeneous nuclear power reactors the nuclear fuel, for example, uranium dioxide ($UO_2$), must be isolated from the reactor moderator, or coolant, for example, in water cooled reactors the fuel must be isolated from the water coolant, in order to prevent intercontamination between the fuel and coolant. A common method of accomplishing this is to incorporate the nuclear fuel into sealed tubes around which the moderator, or coolant, is circulated, the tubes hermetically sealing the fuel from the coolant.

In earlier reactors, the fuel rods were fabricated by inserting pellets of the nuclear fuel into tubes of a suitable material such as a zirconium alloy, for example the zirconium alloys containing small amounts of tin, chromium and iron known in the art as zircaloy. Generally, these pellets are cylindrical in shape and loaded or stacked into the tube, on top of one another, thus substantially filling the inside of the tube. These pellets are formed by pressing and sintering the fuel and then are machined to a precise diameter to assure a close fit in the tube. Obviously this method is very costly and cumbersome.

Because of the disadvantages of the pellet loaded fuel rods, a swaged fuel rod technique evolved. In this method the nuclear fuel is incorporated into the inside of the tube in the form of a powder. The tube is then reduced in outside diameter, generally by swaging, which compresses the powder inside the tube thereby increasing its density somewhat. However, cold swaging techniques are limited in that the resutlant fuel density is only about 87% to 89% of the theoretical solid (zero porosity) density. Because of this reduced density the nuclear fuel exhibits decreased heat conductivity and a relatively high release rate for fission gases such as krypton and xenon.

Using hot swaging techniques, it is possible to obtain fuel densities as high as 93% of the theoretical. However hot swaging also results in deterioration of the fuel rod tube material in that it will exhibit a non-uniform wall thickness and suffers other impairments. Obviously, it would be highly desirable to sinter the fuel powder within the metal tube. Because of the high sintering temperatures, generally 1800° C. and higher, such heating is not feasible usually because the materials currently used for fuel rod tubes will melt, react or are otherwise adversely affected by such high temperatures. Thus, there is a need for a method of increasing the density of nuclear fuels in swaged fuel rods without impairing the integrity of the fuel rod tube.

Accordingly, it is an object of the invention to provide a method for increasing the density of nuclear fuel in swaged rods without adversely affecting the fuel rod tubes.

Another object of the invention is to increase the density of nuclear fuel such as uranium dioxide, uranium carbide and uranium dioxide-plutonium dioxide solid solutions, in swaged fuel elements by means of a sintering operation which does not impair the integrity of the fuel rod tube.

Other objects will, in part, be obvious and will, in part, appear hereinafter.

For a better understanding of the nature and objects of the invention, reference should be made to the following detailed description and drawings, in which.

Figure 1:
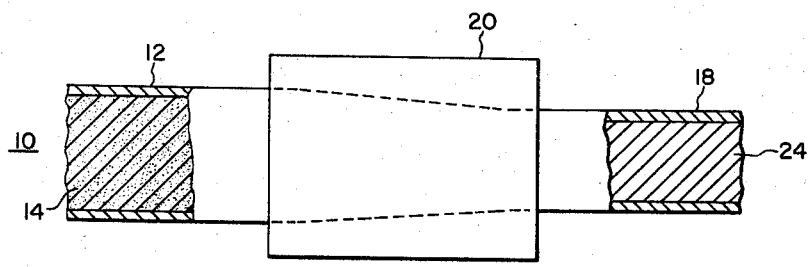
FIGURE 1 is a schematic elevation in cross section of a swaged fuel rod.

FIGURE 1 schematically illustrates a fuel rod 10 comprising a tube 12 containing a nuclear fuel powder compacted to about 70% of the solid fuel density. The tube 12 is reduced in diameter, by passing through a cold swaging means 20, to the extent that the swaged compact 24, contained within the swaged tube 18 exhibits about 87% of the solid fuel density.

Figure 2:
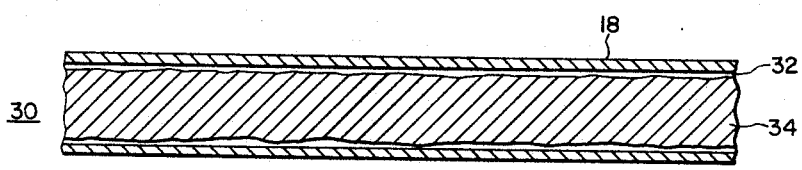
FIGURE 2 is an elevation in cross section of a sintered swaged fuel rod.

FIGURE 2 illustrates a sintered swaged fuel rod 30 comprising the swaged tube 18 and sintered fuel 34. A gap 32 prevails between the fuel and the tube and is attributable to a sharp fuel density increase caused by the ful sintering.

Basically, the present invention resides in (1) working, as by swaging, nuclear fuels, in particular, at least one of the group of uranium dioxide, uranium carbide and uranium dioxide-plutonium dioxide, while the fuel is disposed in a metal tube or other container to the extent that the fuel density is increased to approximately 85% to 89% of its theoretical maximum and then (2) heat treating the composite fuel rod at a temperature of about from 1000° to 1500° C. for a period of from about one-half to three hours. By this method the fuel density may be increased to at least as high as 93% of the theoretical value and even higher. This method, because of the relatively low temperatures involved in the heat treatment and the fact that the swaging or tube working operations are performed at low or room temperatures, will not impair the integrity of the fuel rod tube. Because of the increased density, the fuel rod will exhibit increased heat conductivity and improved fission gas retention. While, generally speaking, the heat treatment above outlined will provide satisfactory results, a narrower heat treatment temperature range of from 1200° to 1350° C. is preferred in order to achieve maximum benefits. Further, if still higher densities are desired, they may be attained by repeating the cold swaging and heat treatment operations one or more times.

In practicing the invention the nuclear fuel, for example uranium dioxide ($UO_2$), should be of the high particle density grade available and used in fabricating swaged fuel elements. In this grade the fuel particles will generally fall within a size range of between a few microns and several thousands of microns. Obviously if it is desired to mix more than one fuel, for example, uranium dioxide and uranium carbide, they should be thoroughly admixed before introduction into the fuel rod tube.

The cold swaging operation may be accomplished by the use of the various swaging or similar metal working means employed in the metal industry. For instance, hammering, cold rolling, rocking, swaging and cold pressing may be employed.

While reference is made to "cold" swaging the term is not intended to place a limitation on the invention. Any compacting operation performed on the encapsulating member which increases the density of the powdered fuel encapsuled therein is equivalent for the "swaging" operation. The term "cold" is intended to designate any relatively low temperature. That is, the temperature should be from room temperature up to that temperature at which the wall of the encapsulating member will be upset or flow laterally sufficient to cause excessive variations or non-uniformity in wall thickness or other impairment to the integrity of the tube material attendant to the well known hot swaging technique described above.

It may be theorized that in practicing the invention, when the nuclear fuel rods are cold swaged, it is possible to impart a non-equilibrium condition in the nuclear fuel. The energy stored in the highly compressed and strained fuel powders is available when the temperature is raised to facilitate recrystallization or sintering of the powder. It is this recrystallization or sintering which causes the marked increase in fuel density achieved by the method of the present invention. It may also be theorized that certain areas which have received more strain, and thus exhibit a greater degree of energy non-equilibrium, tend to form nucleation sites where sintering or recrystallization begins or are centers of grain growth. These explanatory theories are not intended as a limitation on the invention, inasmuch as the results achieved in practice indicate the operativeness of the process.

The temperature for the heat treatment step applied to the swaged fuel rod may vary over a relatively wide range, from about 1000° C. to about 1500° C. for a period of from about one-half to three hours. A cold swaged fuel element heat treated over this range will generally exhibit substantially improved fuel density without impairment of the fuel rod tube. Heat treating for a period of time less than one-half hour or more than three hours will still result in an improved fuel element. It is to be understood that the extreme limits on the heat treatment time are that it be (1) long enough to accomplish the desired sintering effect but (2) not so long as to harm the tube or fuel. It is preferable for the best results in practicing the invention to employ a temperature in the range of from about 1200° to about 1350° C., and to heat treat for a time interval of from about two to three hours. Within these last narrower time and temperature treatment ranges, cold swaged fuel rods exhibit marked improvement in fuel density without any impairment of the tube.

The heat treatment must be performed in an atmosphere which will not react with or contaminate the fuel or fuel rod tube. A neutral, non-oxidizing atmosphere is desirable. If the fuel rod tube is sealed at each end, thus hermetically encapsulating the nuclear fuel, only the reactivity of the fuel rod tube must be considered in selecting an atmosphere for the heat treatment. Generally, the heat treatment should be performed in a vacuum or in an atmosphere of argon or helium, although in some cases hydrogen, nitrogen or other gases are satisfactory.

Of noteworthy importance is the fact that when a cold swaged fuel element is heat treated in accordance with the practice of the invention, it will exhibit a small gap, such as gap 32 illustrated in FIG. 2, between the inside of the fuel rod tube 18 and the sintered nuclear fuel 34 which, in undergoing an increase in density, displays a commensurate decrease in volume which is manifested by a decrease in diameter. That is, the nuclear fuel shrinks away from the walls of the fuel rod tube thereby leaving a space between the tube and the fuel. This may be considered as proof that a very substantial increase in density occurs in the fuel in that its volume is so markedly decreased. If desired, the tube may again be cold swaged thus eliminating the gap. However, in many cases it may be desirable to have the gap present in order to alleviate some of the fuel rod tube strain occurring during use thereof in a nuclear reactor which the thermally expanding nuclear fuel causes in that it expands to a higher extent than the metal tube. That is, the gap between the fuel and the tube will permit the fuel material to undergo substantial thermal expansion before it contacts the inside of the fuel rod tube and begins straining the tube. It is highly desirable that during the initial heating in a reactor the fuel expand to the point where it contacts the fuel rod tube as otherwise the gap will act as a thermal insulating barrier thus seriously hindering heat dissipation from the fuel into the adjacent reactor moderator or coolant. Since in most cases the gap is relatively small this is not a problem; that is, in all nuclear reactor applications the operating temperature of the fuel will be high enough such that the nuclear fuel will expand sufficiently to completely eliminate the gap and the fuel rod tube and the nuclear fuel will be in firm and intimate thermal contact.

As indicated above the cold swaging of the nuclear fuel rod appears to induce a non-equilibrium condition in the nuclear fuel in that substantial energy appears to be stored in the highly compacted powder. It is believed that this non-equilibrium energy effect permits achieving a sintered-like condition at temperatures quite substantially below the normal sintering temperatures for nuclear fuels. Thus, the density of the fuel powder must be increased mechanically and strain must be imparted to its lattice in order to achieve the benefits of the invention. Generally speaking, fuel rod tubes filled in the normal fashion exhibit a fuel density of 60% to 70% of the solid theoretical value. By the use of vibratory means densities may sometimes be increased up to 80%. In practicing the invention sufficient strain is preferably imparted to the nuclear fuel to increase its density to 85% to 89% of the theoretical. While a density increase to this extent is preferable, a density increase of substantially about 80% in the nuclear fuel rod is desired in practicing the invention.

For a better understanding of the nature and scope of the invention reference should be made to the following illustrative examples.

Example I

Stainless steel tubes are filled with high density fired uranium dioxide ($UO_2$) powders and exhibited a density in this state of about 65% to 70% of the solid theoretical, zero porosity, state. The stainless steel tubes are then cold swaged to the extent required to impart a density increase of about up to 87% of the theoretical fuel density. The tubes are then sectioned into three inch lengths, the ends hermetically sealed with welded caps, and heat treated in a hydrogen atmosphere furnace at temperature of from 1200° to 1350° C. and sample removed after time intervals of from one-half to three hours. The microstructure of the fuel in each of the samples is then examined to determine the amount of porosity present in the sample. The fuel had sintered into a dense body. In the sample heat treated for only one-half hour the fuel exhibits a very substantial decrease in porosity, or increase in density, over the fuel in the unheat-treated, cold swaged condition. The samples heat treated for three hours exhibit an even more substantially improved density, over 91% of the theoretical, when compared to the non-heat-treated specimen. All of the samples exhibit a gap between the inside of the fuel rod tube and the outside of the nuclear fuel caused by the shrinking of a nuclear fuel.

Example II

Zircaloy tubes are filled with a high particle density powder of a 50% $UO_2$–$PuO_2$ solid solution. The tubes thus filled exhibit a fuel density of about 75% of the theoretical. The tubes are sealed at the ends and then cold swaged to the extent that the fuel powders density is increased to 88% of the theoretical value. These tubes are sealed at the ends and heat treated in an argon atmosphere furnace at 1350° C. for two hours. After removal from the furnace and cooling down to cold working (below 100° F.) temperatures, the tubes are then again slightly cold swaged thus removing the gap that formed between the fuel and the fuel rod tube during the heat treatment. Upon opening the tubes the fuel rods exhibit a fuel density of about 92% and thus are characterized by substantially improved heat transfer rates and fission gas retention over conventional cold swaged nuclear fuel rods. Further, the methods used in fabricating the fuel rods have not impaired the integrity of the fuel rod tube material.

*Example III*

The fuel rods formed in Example II are again cold swaged to increase the density of the fuel tube slightly over 93%. The heat treatment specified in Example II is repeated. The fuel rods thus fabricated exhibit a density of over 94% of the theoretical value.

It is to be understood that while the invention is described with particular reference to uranium dioxide fuels, such is merely illustrative of the invention and not in limitation thereof. The invention will find substantial application to other nuclear fuels such as uranium carbide (UC) and to solid solution combinations of uranium and plutonium dioxide ($UO_2$–$PuO_2$) and similar fuels. Further, the invention is not limited in application to fuel rods wherein the tube material is zirconium, or its alloys, or stainless steel. The invention will confer substantial benefit on fuel rods wherein the tube is made of any material capable of withstanding a heat treatment sufficient to induce a sintering of a cold swaged nuclear fuel as disclosed herein.

It is to be understood that while the above description makes particular reference to swaged nuclear fuel elements comprising the powdered fuel packed within round element tubes, the invention will find application to swaged nuclear fuel elements wherein the tube comprises encapsulating members of various other geometries, such as flat plates.

The above description is to be considered as illustrative of the invention, and not in limitation thereof.

We claim as our invention:

1. The method of fabricating an improved swaged nuclear fuel element, the fuel element comprising a powdered non-metallic fuel composition substantially filling an encapsulating member, the fuel composition consisting essentially of at least one fuel selected from the group consisting of uranium dioxide, uranium carbide, and uranium dioxide-plutonium dioxide solid solution compositions, the method comprising (1) subjecting the said encapsulating member to a working operation at a relatively low temperature thereby imparting to the fuel encapsulated therein an increase in density to 85% to 89% of the theoretical solid density and a strain to its particles so that the particles can sinter more readily and (2) heating the worked member in a non-reactive atmosphere to a temperature of from about 1000° C. to 1500° C. for a period of time sufficient to sinter the said fuel thereby further increasing its density.

2. The method of claim 1 where the fuel element is again subjected to both the low temperature working and the heat treatment operations of claim 1 thereby further increasing the density of the nuclear fuel.

3. The method of fabricating an improved swaged nuclear fuel element in accordance with claim 1, wherein the worked member is heated in a non-reactive atmosphere to a temperature of about from 1200° C. to 1350° C. for a period of time of about one-half to three hours thereby substantially sintering the said nuclear fuel and further increasing its density.

4. The method of claim 1 where the heat treatment is performed for a period of time of about from two to three hours.

5. The method of fabricating an improved swaged nuclear fuel element, the fuel element comprising a powdered fuel composition substantially filling an encapsulating member, the fuel composition consisting essentially of at least one fuel selected from the group consisting of uranium dioxide, uranium carbide, and uranium dioxide-plutonium dioxide solid solution compositions, the method comprising (1) subjecting the said encapsulating member to a working operation at a relatively low temperature thereby imparting to the fuel encapsulated therein an increase in density and a strain to its particles so that the particles can sinter more readily, (2) heating the worked member in a non-reactive atmosphere to a temperature of from about 1000° C. to 1500° C. for a period of time sufficient to sinter the said fuel thereby further increasing its density, and (3) cold working the heat-treated fuel element to reduce any internal gap between the encapsulating member and the sintered fuel.

References Cited

UNITED STATES PATENTS

| | | | |
|---|---|---|---|
| 3,004,907 | 10/1961 | Precht et al. | 176—82 |
| 3,168,399 | 2/1965 | Takahashi et al. | 29—420 |
| 3,177,578 | 4/1965 | Barr | 29—474 |

FOREIGN PATENTS

| | | |
|---|---|---|
| 1,289,147 | 2/1962 | France. |

JOHN F. CAMPBELL, *Primary Examiner.*

P. M. COHEN, *Assistant Examiner.*

U.S. Cl. X.R.

29—400, 474.3; 264—5